Oct. 25, 1960
E. J. HERBENAR
2,957,713
BALL JOINT AND SEAL THEREFOR
Filed Jan. 13, 1956
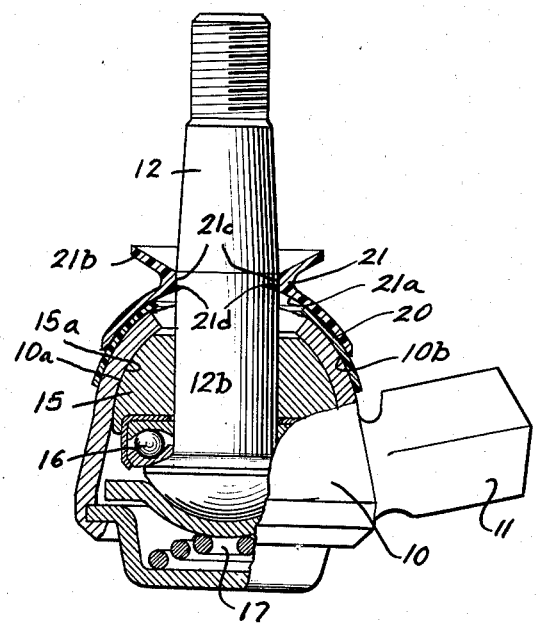
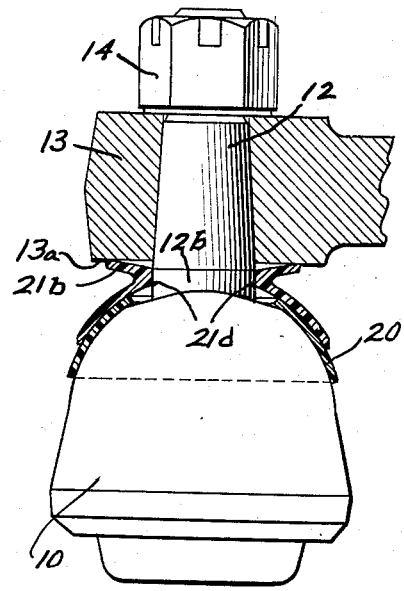
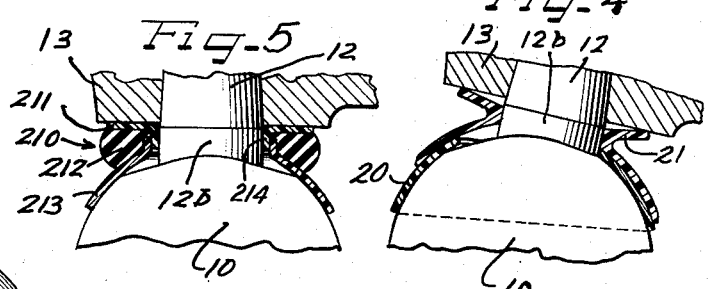
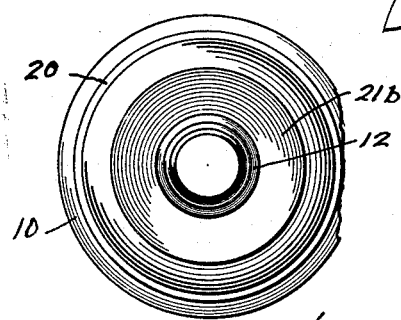
Inventor
EDWARD J. HERBENAR
by Hill, Sherman, Meroni, Gross & Simpson Attys.

United States Patent Office 2,957,713
Patented Oct. 25, 1960

2,957,713

BALL JOINT AND SEAL THEREFOR

Edward J. Herbenar, Detroit, Mich., assignor to Thompson Ramo Wooldridge Inc., Cleveland, Ohio, a corporation of Ohio Filed Jan. 13, 1956, Ser. No. 558,868

7 Claims. (Cl. 287—90)

The present invention relates to the construction of pivotal joints and is, more particularly, concerned with the provision of a substantially improved seal element for preventing the ingress of foreign matter into the bearing surfaces of the joint.

As those familiar with the field of ball joint construction are aware, the problem of satisfactorily sealing the pivotal connection between movable members is a difficult one, especially where extremely hard usage is involved. This has been particularly true in the automotive field in connection with tie rod joints or other similar joints employed in the running gear of the vehicle. This is true since the vehicle running gear or suspension joints encounter continuous as well as violent vibration. Further, such joints require constant lubrication and conventional lubricants have affected, in many cases, sealing materials that would otherwise have proved satisfactory.

The present invention provides a novel and extremely simple seal member which not only provides a sealing action but also aids in minimizing the turning friction between the jointed members. In further accordance with the present invention this seal is constructed of a self-lubricating material substantially impervious to attack by conventional mineral base lubricating oils or the like and is provided with a construction permitting its utilization substantially throughout the entire life of the components of the joint proper.

Specifically, the present invention provides a seal element preferably constructed of high molecular weight polyamide or polyethylene resins, for example, low friction polyethylene which is commercially sold under the trademark "Alathon." Such materials have been found to be essentially self-lubricating when positioned in sliding contact with metal parts and, further, are capable of deformation under load without such deformation becoming permanent.

It is, accordingly, an object of the present invention to provide a novel joint seal providing a pair of opposed substantially self-lubricating bearing surfaces with means forming a part of the seal for urging the bearing surfaces apart.

Another object of the present invention is to provide an improved seal impervious to mineral base lubricants, which is self-lubricating in bearing contact with metals, and which provides an integrally formed spring biasing means for maintaining the seal in snug substantially leakproof bearing fits.

An object of the invention is the provision of an inexpensive seal member for single axis or universal axis joint connections.

Still another object of the present invention is to provide simple self-lubricating resilient seal utilizing a minimum number of parts.

A feature of the invention resides in the construction of a joint seal from a single piece of anti-friction plastic material.

Another feature of the invention resides in the provision of a seal having a segmental spherical bearing surface of self-lubricating material and a seal force applying portion for maintaining said seal in position in a sealing relationship between a pair of pivotal joint members.

Still other and further objects and features of the present invention will at once become apparent to those skilled in the art from a consideration of the attached drawings wherein two preferred forms of the present invention are shown by way of illustration only, and wherein:

Figure 1 is a side elevational view in partial cross section illustrating a seal constructed in accordance with the principles of the present invention prior to complete assembly of the joint;

Figure 2 is an end elevational view of the joint illustrated in Figure 1 subsequent to completion of assembly of the joint;

Figure 3 is a plan view of the seal assembly illustrated in Figure 1;

Figure 4 is a side elevational view of the seal elements of the present invention in their joint-tilted condition; and Figure 5 is a side elevational view in cross section of a modified form of seal constructed in accordance with the principles of the present invention.

As shown on the drawings:

As may be seen from a consideration of Figures 1, 2, 3 and 4, a joint housing 10 having a securing flange 11 for attachment to a first joint carrying member of a desired form, not shown, carries a ball stud 12 for securement to a second joint carrying member 13 by means of a nut 14. The stud 12 is pivotally connected to the housing 10 in a conventional manner which, in the form illustrated in Figure 1, comprises a universal pivot connection. This connection is formed by means of a segmental spherical bearing ring 15 which is rotatably mounted on the stud 12 for antifriction rotation relative thereto through ball bearings 16. Tilting of the stud is accommodated by means of the outer segmental spherical surface 15a of the bearing ring which cooperates with an internally facing segmental spherical bearing surface 10a in the housing 10. Spring biasing means 17 maintains the stud 12 against the ball bearing 16 and hence maintains the bearing ring 15 snugly against the surface 10a of the housing. It will be understood, of course, that substantially any pivotal joint, either pivotal about one axis or universally pivotal, may be provided within the housing 10 for accommodating tilting movement of the stud 12 and such specific joint construction forms no part of the present invention.

As shown in Figures 1, 2, 3 and 4, the outer surface of the housing 10 is segmental spherical at 10b for cooperation with a thin segmental spherical seal member 20. The seal member 20 is in turn constructed with a segmental spherical curvature for cooperation with the inner segmental spherical surface 21a of the seal 21. The seal 21 is provided with a circular aptreure 21c which snugly engages a cylindrical portion 12b of the stud 12. Above the necked-in portion 21c, an outwardly-upwardly flaring bearing and pressure flange 21b projects for cooperation with the joint member 13. In its unstressed condition, shown in Figure 1, the pressure flange 21b extends upwardly at a substantial angle, approximating 30°. Upon assembly of the joint, however, the parts take the positions shown in Figure 2 in which the pressure flange 21b is depressed by the surface 13a, into a substantially flat position.

It has been found that plastic material such as, for example, polyethylene selling under trade names such as "Alathon" not only has a low coefficient of friction and is uncorrosive but is stable at high and low temperatures encountered in automobiles as well as in the lubricants ordinarily used in ball joints. Further, this material, in relatively thin sections as shown, is somewhat resilient, thereby permitting its deflection into the position shown in Figure 2 and its return to the position shown in Figure 1 upon disassembly of the joint. Accordingly, the necked-in construction of the seal shown in Figures 1 and 2 provides a spring action essentially the same as that of a conventional steel Belleville spring, thereby maintaining the segmental spherical surface 21a of the member 21 in snug bearing contact with the bearing member 20 at all times. This snug fit is sufficiently tight to prevent grease from leaking out of the joint. Further, in view of the self-lubricating qualities of the polyethylene material, the resistance of the joint is not materially increased.

At the same time that the Belleville action of the seal 21 causes the application of a high sealing pressure between the surface 21a and the member 20, deflection of the pressure flange 21b causes an inward movement of the lower corner 21d of the necked-in portion 21b causing the normally snug fit between the seal 21 and the stud shank portion 12b to become increasingly tight. This action provides further positive seal preventing leakage of grease from the joint out along the surface of the stud.

It will be understood that the seal member 20 illustrated in Figures 1, 2, 3 and 4 may be dispensed with if the joint being sealed is intended to be operative through only a relatively small angle, in which case the segmental spherical skirt portion 21a of the seal 21 is sufficient to cover the entire open area in all positions. However, in wide angle structures in which the angular position of the stud relative to the housing 10 will vary through a wide range, such as for example as illustrated in Figure 4, it is desired that the separate member 20 be provided. It is, of course, possible to use more than one bearing member 20 to provide even greater angles of tilt than illustrated in Figure 4.

Further, it will be understood that certain other materials may be used in the construction of the present seal without departing from the scope of the present invention. For example, "nylon" or the high molecular weight polyamides may be successfully used in view of its self-lubricating nature, its relatively great stability and its tough relatively resilient nature which permits it to act as a spring when formed into the necked-in shape illustrated.

In the modified form shown in Figure 5 the seal 210 is constructed in three parts. As shown, an upper pressure flange portion 211 acts to compress a resilient ring 212 against a segmental spherical bearing portion 213. As in the embodiment shown in Figures 1 through 4, the members 211 and 213 are preferably constructed of polyethylene or nylon plastic and the ring 212 is constructed of synthetic rubber or other plastic material resistant to lubricating greases, gasoline and other chemicals ordinarily found on and around automotive suspension systems. As in the case of the embodiment shown in Figures 1 and 2, tightening of the joints by movement of the joint member 13 toward the joint member 10, causes the portion 210 to move downwardly pressing the resilient member 212 and forcing the inner flange 214 into snug engagement with the stud portion 12b. At the same time, the bearing ring portion 213 is tightly positioned against the housing 10. In the form shown in Figure 5, no separate bearing ring comparable to the ring 20, shown in Figures 1 and 2, is provided. It will be understood, however, that such ring may be utilized if the joint is intended to operate through relatively wide angles as above explained.

It will thus be seen that I have provided a novel and substantially improved self-lubricating seal for joints of the type intended to provide tilting action between a pair of joint members. Although a universal joint has been herein illustrated, it will be understood that the present seal may be utilized in joints pivoting about a single axis. It will further be understood that variations and modifications may be made in the structure illustrated in the drawings without departing from the scope of the novel concepts of my invention. Accordingly, it is my intention that the present invention be limited solely by the scope of the hereinafter appended claims.

I claim as my invention:

1. In combination in a pivotal joint, a first joint member, a second joint member, said first joint member having an arcuate outwardly bowed surface facing a substantially flat surface on said second joint member, a stud extending between said members and securing them together, an annular resilient seal surrounding said stud between said joint members, said seal having an arcuate bearing surface in bearing engagement with said first member, a reduced diameter neck portion snugly fitting said stud and a radially and axially outwardly flaring annular pressure flange on the side of said reduced portion opposite from said arcuate bearing surface and having peripheral edge engagement with said second joint member.

2. In combination in a pivotal joint, a first joint member, a second joint member, said first joint member having an arcuate outwardly bowed surface facing a substantially flat surface on said second joint member, a stud extending between said members and securing them together, an annular resilient seal surrounding said stud between said joint members, said seal having an arcuate bearing surface in bearing engagement with said first member, a reduced diameter neck portion snugly fitting said stud and a radially and axially outwardly extending annular pressure flange on the side of said reduced portion opposite from said arcuate bearing surface for engagement with said second joint member, and means forming a part of said seal urging said arcuate bearing surface and flange axially apart and the peripheral edges thereof tightly against said joint members when said joint members are assembled.

3. In combination in a pivotal joint, a first joint member, a second joint member, said first point member having an arcuate outwardly bowed surface facing a substantially flat surface on said second joint member, a stud extending between said members and securing them together, an annular resilient seal surrounding said stud between said joint members, said seal having an arcuate bearing surface in bearing engagement with said first member, a reduced diameter neck portion snugly fitting said stud and a radially and axially outwardly extending annular pressure flange having an annular peripheral edge on the side of said reduced portion opposite from said arcuate bearing surface for engagement with said second joint member, and means forming a part of said seal for urging said arcuate bearing surface and flange apart and tightly against said joint members when said joint members are assembled, said last named means forming an integral part of said seal and comprising an initial construction of said reduced diameter portion requiring deflection thereof when said joint members are assembled.

4. In combination in a pivotal joint, a first joint member, a second joint member, said first joint member having an arcuate outwardly bowed surface facing a substantially flat surface on said second joint member, a stud extending between said members and securing them together, an annular resilient seal surrounding said stud between said joint members, said seal having an arcuate bearing surface in bearing engagement with said first member, a reduced diameter neck portion snugly fitting said stud and an axially and radially outwardly flaring pressure flange on the side of said reduced portion opposite from said arcuate bearing surface for engagement with said second joint member, and means forming a part of said seal for urging the outer peripheral edges of said arcuate bearing surface and flange tightly against the respective joint members and said reduced neck portion against said stud when said joint members are assembled, said seal comprising a single piece of self-lubricating relatively resilient plastic.

5. In combination in a pivotal joint, a first joint member, a second joint member, said first joint member having an arcuate outwardly bowed surface facing a substantially flat surface on said second joint member, a stud extending between said members and securing them together, an annular resilient seal surrounding said stud between said joint members, said seal having an arcuate bearing surface in bearing engagement with said first member, a reduced diameter neck portion snugly fitting said stud and an axially and radially outwardly flaring pressure flange on the side of said reduced portion opposite from said arcuate bearing surface for peripheral edge engagement with said second joint member, and means on said seal for urging said arcuate bearing surface and flange tightly against said joint members when said joint members are assembled, said flange and said arcuate bearing surface comprising separate pieces of antifrictional plastic slidingly interconnected at said reduced diameter portion and urged apart by an annular ring of elastic material.

6. In combination in a pivotal joint, a first joint member, a second joint member, said first joint member having an arcuate outwardly bowed surface facing a substantially flat surface on said second joint member, a stud extending between said members and securing them together, an annular resilient seal surrounding said stud between said joint members, said seal comprising a single piece of self-lubricating relatively resilient plastic and having an arcuate bearing surface in bearing engagement with said first member, a reduced diameter portion snugly fitting said stud and a pressure flange on the side of said reduced portion opposite from said arcuate bearing surface for engagement with said second joint member, the resiliency of said seal urging said arcuate portion and flange tightly against said joint members when said joint members are assembled, and said pressure flange comprising an annular flange extending outwardly from said reduced diameter portion at an acute angle relative to the longitudinal axis of said stud whereby assembly of said joint members causes deflection of said pressure flange with a resultant constriction of the internal diameter of said reduced diameter portion and application of bearing pressure by said seal against said arcuate surface of said first joint member and of said reduced diameter portion against said stud.

7. A seal element comprising a generally annular ring of resilient plastic material having the central radially inwardly facing portion thereof defining a circular aperture and having oppositely axially facing bearing and pressure flanges integrally connected to said portion, said bearing flange having a generally axially facing segmental spherical bearing surface the center of curvature of which lies substantially on the axis of the said aperture, and said pressure flange flaring generally radially outwardly and axially from said portion at an acute angle relative to said axis to provide an annular outer peripheral sealing edge.

References Cited in the file of this patent

UNITED STATES PATENTS

| | | |
|---|---|---|
| 1,482,756 | Liebowitz | Feb. 5, 1924 |
| 2,613,962 | Dahl | Oct. 14, 1952 |
| 2,688,436 | Melaven | Sept. 7, 1954 |
| 2,688,506 | Bakker | Sept. 7, 1954 |
| 2,807,486 | Bixby | Sept. 24, 1957 |